March 22, 1932.  T. D. NATHAN  1,850,684
DRIVE RING AND METHOD OF MAKING THE SAME
Filed June 10, 1929
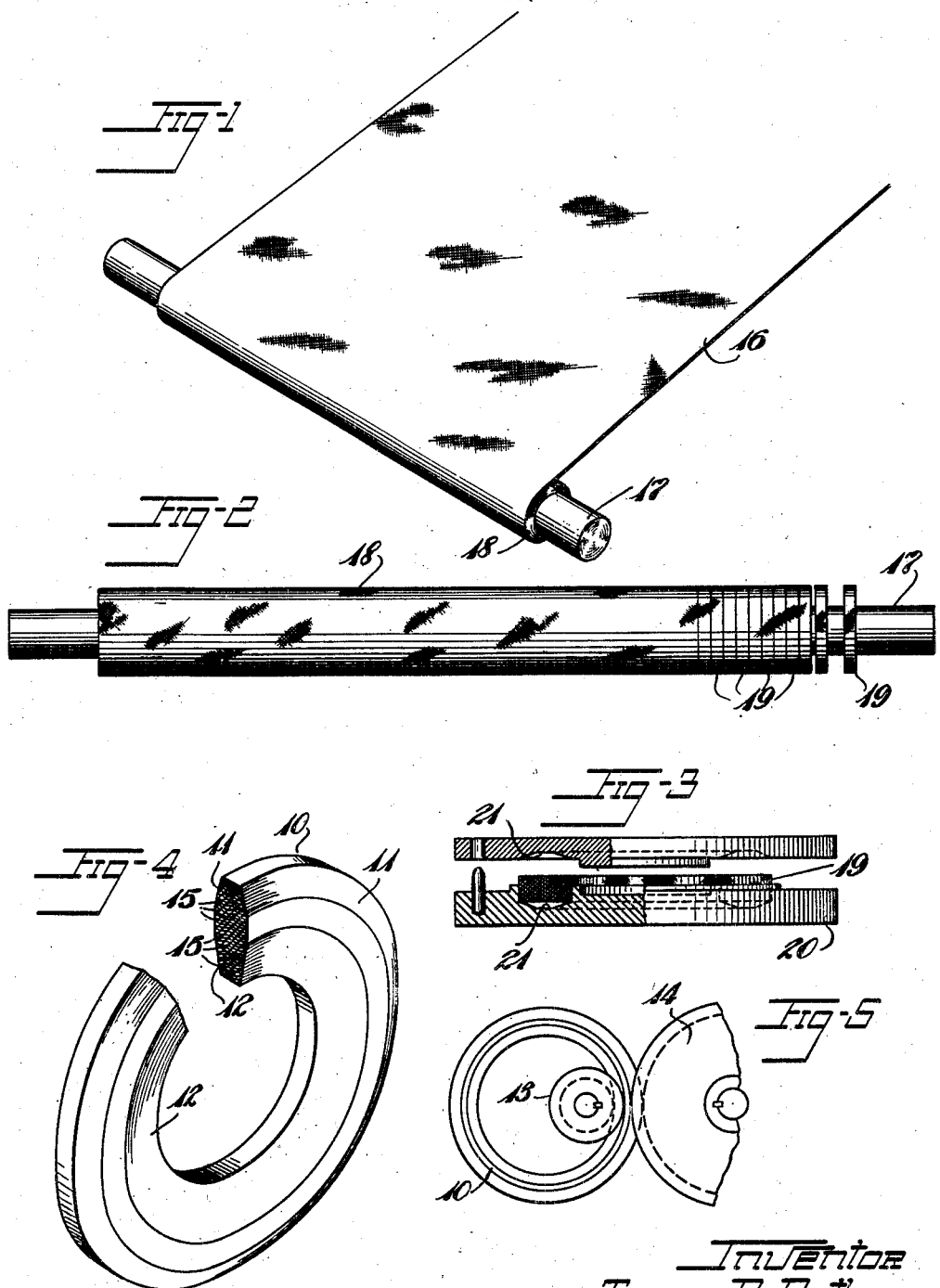
Inventor
Tracy D. Nathan
By Eakin & Avery
Attys- Patented Mar. 22, 1932

1,850,684

UNITED STATES PATENT OFFICE

TRACY D. NATHAN, OF AKRON, OHIO, ASSIGNOR TO THE B. F. GOODRICH COMPANY, OF NEW YORK, N. Y., A CORPORATION OF NEW YORK

DRIVE RING AND METHOD OF MAKING THE SAME

Application filed June 10, 1929. Serial No. 369,880.

This invention relates to drive rings and methods of making the same.

In its preferred form the ring comprises an annular, reinforced, rubber structure which in cross-section is tapered toward its inner and outer peripheral faces. The ring is adapted to be mounted between driving and driven members, loosely surrounding one of the same, and frictionally to engage complementally shaped grooved pulleys on said members, one of said members preferably being urged toward the other member to confine a local region of the ring between them.

The chief objects of the invention are to provide a drive ring of the character mentioned which will be transversely compressible to assure good driving friction; which will have radial and longitudinal stiffness to prevent whipping and to assure true running and uniform wear; and to provide a simple and economical method of making such a ring.

Of the accompanying drawings:

Fig. 1 is a perspective view of a mandrel, and a sheet of material being wound thereon as the initial step in the manufacture of my improved drive ring.

Fig. 2 is a side elevation of the same elements at a subsequent stage of manufacture.

Fig. 3 is a transverse section, partly in elevation, of a mold and a ring-forming blank therein.

Fig. 4 is a perspective view of a finished drive ring, a part being broken away and a part being in section.

Fig. 5 is a fragmentary elevation of a driving member and a driven member, and my improved drive ring in operative association therewith.

Referring now to Fig. 4 of the drawings, my improved drive ring comprises an annular laminated structure 10 of fabric and vulcanized rubber, the lateral faces of the ring being oppositely tapered at 11, 12 respectively toward the outer and inner peripheral faces of the ring. The ring is shaped to fit complemental peripheral grooves formed in the perimeters of a driving pulley 13 and driven pulley 14, as shown in Fig. 5, one of said pulleys preferably being urged toward the other to confine the ring between them and to assure good driving friction.

As is clearly shown in Fig. 4 the ring 10 is a laminated structure comprising a plurality of circumferentially disposed fabric plies 15, 15 bonded together with vulcanized rubber, the plies preferably consisting of successive superposed convolutions of a single length of fabric. Viewed in transverse section, the fabric plies 15 present a bowed, fulled or corrugated appearance, which arrangement provides longitudinal stiffness to prevent whipping of the ring in use, and also provides transverse resilience to the ring, which contributes to obtaining good driving friction.

In the manufacture of my improved drive ring I prefer to employ a single strip of rubberized, bias laid, square woven fabric 16 of suitable width to provide a plurality of moldable blanks, and I wrap the strip 16 upon a cylindrical mandrel 17 in a plurality of superposed convolutions until the resulting tubular structure 18 attains the outside diameter desired, the diameter of the mandrel 17 being the same as the inside diameter of the finished ring 10. The tubular structure 18 is then transversely severed into a plurality of annular blanks 19, 19 of rectangular cross-section. The severing of the tube 18 may be effected while the tube is on the mandrel 17 as shown, or after it has been removed therefrom. The transverse thickness of each blank corresponds substantially to the greatest transverse thickness of the finished ring.

The blanks 19 are then placed in molds, such as the mold 20, Fig. 3, and vulcanized under heat and pressure in any usual or preferred manner, the pressure being applied in an axial direction. The mold cavity 21 of the mold 20 is shaped to impart to the lateral faces of the blank 19 the oppositely tapered contour described with respect to the ring 10, and, since the blank 19 is of uniform thickness corresponding to the greatest thickness of the ring 10, the result of the molding operation is to distort or full the fabric plies of the blank and thus produce the corrugated or fulled effect described as to the plies 15 of the ring 10.

The mold-cavity 21 is so formed that the tapered molding surfaces which shape the lateral faces of the blank 19 first engage the latter adjacent its respective peripheral faces, and, as the mold is closed upon the blank, apply pressure transversely thereto by progression in a radial direction from each periphery of the ring toward the medial region thereof, with the result that the fabric is highly distorted in the peripheral portions of the ring and regularity of distortion is provided.

My method is simple and economical in operation, there is no rubberized fabric scrap, and it produces an improved drive ring whereby the other objects set forth in the foregoing statement of objects are attained.

My invention may be modified within the scope of the appended claims, and I do not limit my claims wholly to the specific construction or exact procedure shown and described.

I claim:

1. A drive ring comprising an annular rubber structure having its sides tapered toward their inner and outer peripheries and an internal reinforcement therein comprising bias fabric plies extending in general in a direction parallel to the axis of the ring but bowed out of parallelism with said axis along their central portions.

2. A drive ring comprising an annular rubber structure and an internal reinforcement therein of fulled bias fabric plies extending from one lateral driving face to another and spaced more closely along the driving faces than through the central plane of the ring.

3. A drive ring comprising an annular rubber structure, and internal reinforcement therein of circumferentially disposed bias fabric plies which are transversely distorted into bulges or corrugations and are disposed substantially concentric with the axis of the ring at the sides thereof.

4. A drive ring as defined in claim 3 in which the fabric plies comprise successive convolutions of a single length of fabric.

5. A drive ring comprising an annular, bias fabric-reinforced rubber structure tapered in cross-section toward its inner and outer peripheries.

6. A drive ring comprising an annular rubber structure tapered in cross-section toward its inner and outer peripheries, and internal reinforcement therein comprising plies of bias fabric which are fulled transversely of the ring and whose margins are disposed substantially concentric with the axis of the ring.

7. The method of making drive rings which comprises assembling an annular structure of unvulcanized rubber and transversely disposed bias fabric plies, reducing the radial spacing of the margins of the plies by transverse angularly applied pressure and vulcanizing the ring while the fabric plies are so distorted.

8. The method of making drive rings which comprises assembling an annular structure of unvulcanized rubber and transversely disposed bias fabric plies extending circumferentially of the ring, angularly applying pressure to the margins of the fabric plies to bow or bulge the latter internally of the ring and to radially compact the marginal portions thereof, and then vulcanizing the ring while maintaining said pressure.

9. The method of making drive rings which comprises assembling an annular structure of unvulcanized rubber and transversely disposed bias fabric plies, said structure having uniform rectangular cross-section, so applying to the structure transversely directed pressure as to cause greater displacement of the structure toward the inner and outer peripheries than at an intermediate zone thereof, and then applying vulcanizing heat thereto.

10. The method of making drive rings which comprises assembling an annular, transversely rectangular structure of unvulcanized rubber and plies of bias fabric, applying pressure to the lateral faces of the structure by progression in a radial direction from its respective inner and outer peripheries, and then vulcanizing the ring.

In witness whereof I have hereunto set my hand this 7th day of June, 1929.

TRACY D. NATHAN.